United States Patent
Kushalnagar et al.

(10) Patent No.: US 7,594,007 B2
(45) Date of Patent: Sep. 22, 2009

(54) DISTRIBUTED SERVICE MANAGEMENT FOR DISTRIBUTED NETWORKS

(75) Inventors: Nandakishore Kushalnagar, Portland, OR (US); Mousumi M. Hazra, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 429 days.

(21) Appl. No.: 11/479,642

(22) Filed: Jun. 29, 2006

(65) Prior Publication Data

US 2008/0005306 A1    Jan. 3, 2008

(51) Int. Cl.
*G06F 15/173* (2006.01)

(52) U.S. Cl. .................................... 709/223

(58) Field of Classification Search ................ 709/223
See application file for complete search history.

(56) References Cited

U.S. PATENT DOCUMENTS

| 5,877,957 | A * | 3/1999 | Bennett .................... 700/86 |
| 6,853,841 | B1 * | 2/2005 | St. Pierre .................... 455/420 |
| 7,170,857 | B2 * | 1/2007 | Stephens et al. ............ 370/230 |
| 2005/0259646 | A1 * | 11/2005 | Smith et al. ................ 370/389 |
| 2006/0014536 | A1 * | 1/2006 | Demirhan et al. ........... 455/434 |
| 2006/0136475 | A1 | 6/2006 | Karmakar | |

* cited by examiner

*Primary Examiner*—Larry D Donaghue
*Assistant Examiner*—Bryan Lee
(74) *Attorney, Agent, or Firm*—Blakely, Sokoloff, Taylor & Zafman LLP (57) ABSTRACT

Methods and apparatuses enable distribution of service management in a distributed network. A leader node discovers networked devices of the distributed network, and services associated with the devices. The services are grouped into one or more groups of distributed services, which can be controlled via single point of control in a virtual device. A virtual device is generated to receive and distribute controls for the groups of services. The virtual device may also provide network management.

14 Claims, 6 Drawing Sheets

DISTRIBUTED SERVICE MANAGEMENT FOR DISTRIBUTED NETWORKS

FIELD

Embodiments of the invention relate to distributed network management, and more specifically to distributing service management in a distributed network.

BACKGROUND

Traditional services, for example, Universal Plug and Play (UPnP) based services such as UPnP AP 1.0, internet services, file sharing services, etc., are client-server based. Usually each network device runs the service. Services in a distributed network such as an extended service set (ESS) mesh network are distributed to one or more devices of the network. As services become distributed, behavior changes in one service in one device should be percolated throughout the network to similar services running on other devices. Traditional approaches to collaborating behavior change throughout the network may result in prohibitive management of multiple devices. The increase in needs for management increase the complexity and costs associated with maintaining a mesh network.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

The traditional client server model can be extended to manage distributed servers or nodes in a distributed network having services. Using a virtual device running on a defined network leader device, the network services of the entire network can be virtualized at a single point of control. A single client (e.g., a control point) can view the network as a single entity instead of concentrating on servicing individual nodes within a distributed network. The virtual device runs on one node of the distributed network (e.g., a mesh network) and includes one or more virtual services running on the node that virtualizes other services in the network. The virtualized services can be portrayed from the virtual device as a single service. Virtualizing the services refers to any form of providing a layer of abstraction over the actual services. Thus, a user views the distributed services as a single service from the virtual device.

The node having the virtual device/service advertises itself on the distributed network as a single service, and disseminates behavior changes across all distributed services in the network. The virtual device also events changes within any distributed service across the network to enable control points and services to take desired action on the distributed services. A control point can choose to use any of known client-server techniques (e.g., transport control protocol (TCP), UPNP, etc.), to communicate with each device of the network. The control point also, or alternatively, uses the virtual device as a centralized control mechanism to intelligently control the networked services as a whole. The virtualization or abstracting of the services allows a traditional control point to seamlessly manage distributed services. Control points can remain simple and manage the network, even as the complexity of the distributed network increases.

One or more nodes on the distributed network can include a virtual machine or virtual device. In one embodiment, the nodes on the distributed network are access points (APs). For an example of a mesh network, assume that all devices (nodes) in the distributed network operate on the same channel, share the same ESSID (ESS identifier), etc. Changing the channel of one node in the network would "remove" the node from the ESS mesh. In order to keep the network operating together and change the channel in a traditionally managed network, each node in the ESS mesh would have to have its channel changed.

Through distributed management, a virtual device can virtualize aspects of management and control through the network. To determine where the virtual device will operate, a leader node is chosen within the distributed network. The leader node can be chosen through a leader election process, or based upon an availability of resources (e.g., available memory, processing, etc.). The leader node executes the virtual device that virtualizes the distributed services.

The leader node can discover the services within the network by listening to the advertisements from various nodes within the distributed network. The leader node may, for example, maintain one or more tables of types of services and identification of nodes that advertise particular services. For example, a table can be maintained for each type of service. Alternatively, a table can be maintained that stores all services, with an entry or field to indicate the group to which the service belongs. The identification may be, for example, maintaining information related to an IP (Internet Protocol) address and port number of the service. The particulars of the services from each node (e.g., device control protocols (DCPs), service control protocols (SCPs)) can be stored within a memory of the leader node.

The leader node creates a service similar to that of the distributed services. The created service is referred to as a virtual service. The created service acts as a grouping mechanism to group distributed services together. In one embodiment, the virtual service includes a super-set of all actions supported by all distributed services. Lesser groupings can be made. The leader node can advertise the virtual service within the distributed network. The advertisement may include the service, as well as indicate that the advertised service is virtual.

With a virtual service created, the control points within the network determine whether to control individual services through the service advertisements sent (i.e., control each individual distributed service), or whether to control the virtual service (which then controls the distributed services). In one embodiment, a control point is human operated, and the selection is performed by the user. In another embodiment, a control point includes one or more automated components that generate a control message based on a determination algorithm. The user or the determination algorithm may select controlling the services with the virtual service if a change within one service needs to be disseminated within the entire network of services (e.g., changing channel), if a change in the virtual service would lead to multiple actions on various distributed services (e.g., the change is automatically propagated through the network), or if use of the virtual service is mandatory in a particular implementation.

When a control point on the network sends a control message to the virtual service of the virtual device, the leader node can look up rules, if any, associated with the particular service. The rules affect how the virtual service disseminates the control actions to the services on the distributed network that are known (e.g., were discovered, for example, by listening for service advertisements). Rules may include, for example, an indication of a control channel or an indication of a transmission protocol. If a control point sends a message to the virtual device to change a channel, the virtual device would then request other nodes to also change channels in response to the received control message. The virtual device can communicate with the other devices via any known communication mechanism (e.g., a client-server protocol).

In one embodiment, distributed services share events indicating changed states. The changed states can be reflected within the virtual service. Intelligent actions can then be taken by the virtual device to keep services synchronized. The virtual device can monitor and/or compare the states of the distributed services, and issue commands to cause the services to synchronize.

In one embodiment, the virtual device performs other actions, for example, but not limited to, taking multiple actions based on a single action control, providing network management, and/or providing fault tolerance. A single action control command may be received with respect to a service, and the virtual device can determine that other related actions should be taken in conjunction with the requested control. Regarding network management, the virtual device can be configured to perform any of a number of management actions (e.g., actions related to viewing network conditions, analyzing network conditions, load balancing among services, security management, fault management). Fault tolerance refers to fault management actions that may include detecting and isolating malfunctioning nodes, correcting malfunctions, maintaining an error log, performing network diagnostics, etc.

Figure 1:
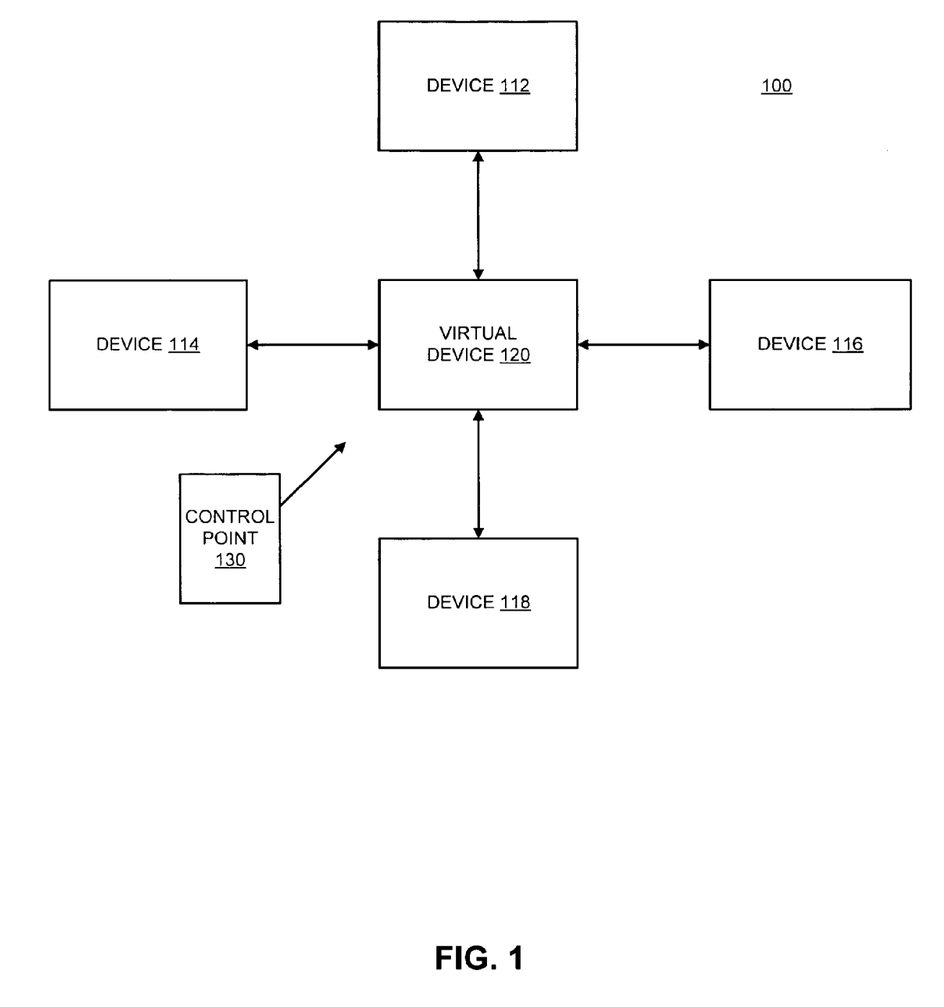
FIG. 1 is a block diagram of an embodiment of distributed system having a virtual device coupled to the distributed network nodes.

FIG. 1 is a block diagram of an embodiment of distributed system having a virtual device coupled to the distributed network nodes. Network 100 represents a distributed network. As used herein, a distributed network refers to any type of distributed network where multiple services can provided throughout the network rather than from a single server. In one embodiment, network 100 is or is part of an ESS mesh network. Network 100 includes devices 112-118, which may each have services that are the same or different from the other devices.

Virtual device 120 provides a single point of control, as described herein. Virtual device 120 discovers the services available from each of devices 112-118. In one embodiment, the services are stored in a table, which may further include rules or protocols related to the services, and an indication of which devices are associated with each service. From the listing of services, virtual device 120 can generate a virtual service that provides a single point of control for all related services. Virtual device 120 generates a logical grouping of the distributed services under the virtual service. Thus, the virtual service allows access to control the distributed services from a single point, as opposed to being required to control each service separately.

Control point 130 represents an external control that provides a control signal to affect one or more services in network 100. Control point 130 accesses virtual device 120 to effect a change or action in each of the distributed services.

Figure 2:
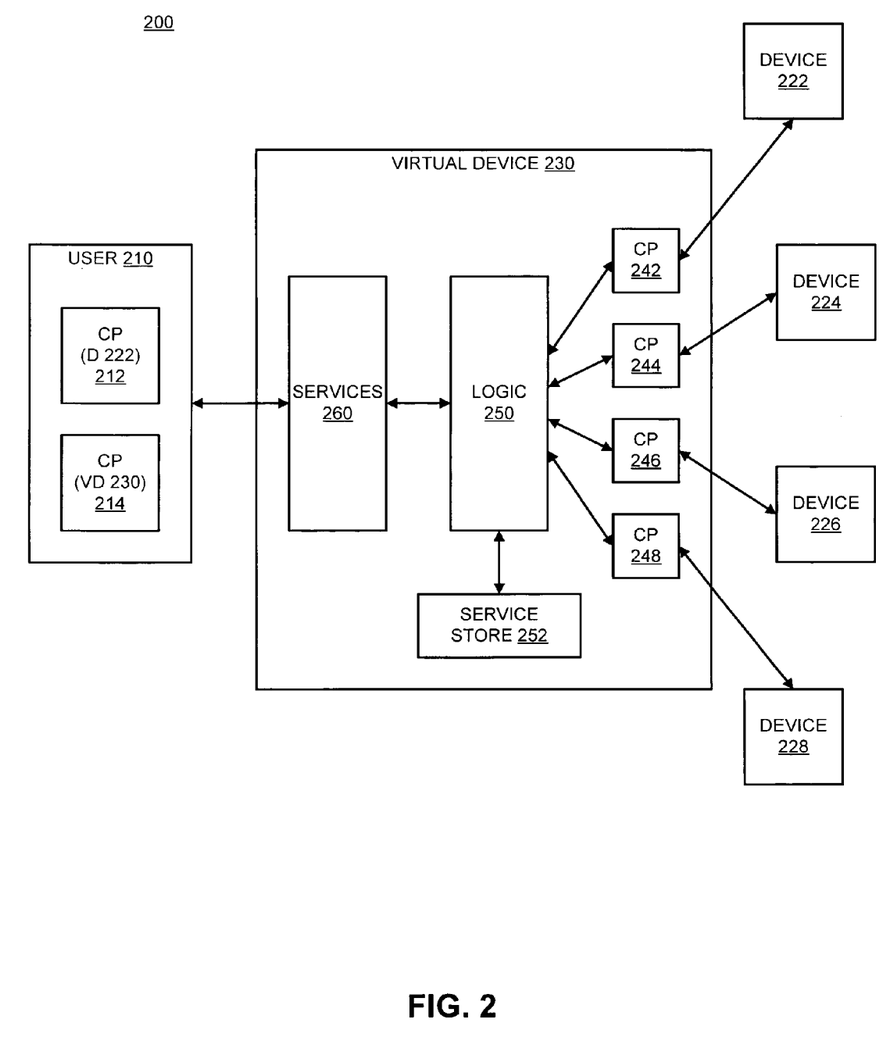
FIG. 2 is a block diagram of an embodiment of a distributed system having a virtual device with a control point and processing logic.

FIG. 2 is a block diagram of an embodiment of a distributed system having a virtual device with a control point and processing logic. Network system 200 provides an example of a distributed network according to any embodiment described herein. Network 200 includes devices 222-228, each having one or more services. Devices 222-228 advertise their services over the distributed network. Virtual device 230 includes control points 242-248, which correspond to devices 222-228, respectively. Control points 242-248 provide access by virtual device 230 to the services of devices 222-228. Control points 242-248 may be agents or interfaces executing on virtual device 230. In one embodiment, virtual device 230 discovers devices 222-228 through control points 242-248.

Virtual device 230 includes logic 250, which may be or include one or more applications, hardware circuits, modules, routines, etc., or some combination, to perform one or more algorithms or operations that provide intelligence with respect to the services discovered. Logic 250 is coupled to service store 252, which represents any type of memory or storage device and/or structure (e.g., database, table) that stores services and device information. Services discovered can be listed in service store 252 with associated protocols, rules, or other information. Logic 250 determines what actions or services are affected by a particular control received. Logic 250 groups the services discovered on devices 222-228 and generates one or more virtual services 260, which can be presented to a control point. In one embodiment, logic 250 determines how to group the services to eliminate redundancies of services on network 200.

Virtual services 260 represent the groups of services on network 200. Virtual services 260 are presented to user 210 to indicate what services are available on network 200. Thus, user 210 does not need to discover what services are available, nor does user 210 need to control each service separately. User 210 includes control point 212 for device 222. Through control point 212, user 210 can control device 222. Also, user 210 includes control point 214 for virtual device 230. Rather than controlling device 222, user 210 can use control point 214 to control a virtual service 260 associated with the service of device 230 that is desired to be controlled. Other services in the same group could also be affected through distribution by virtual device 230 of the control signal. Virtual device 230 may also determine through logic 250 that other actions can or should be performed in conjunction with the requested action, in response to the control signal.

In one embodiment, virtual device 230 performs multiple actions in response to a single received control signal. Thus, a virtual device 230 may receive a control signal and distribute multiple signals to a particular group of services in response to the one control signal.

Figure 3:
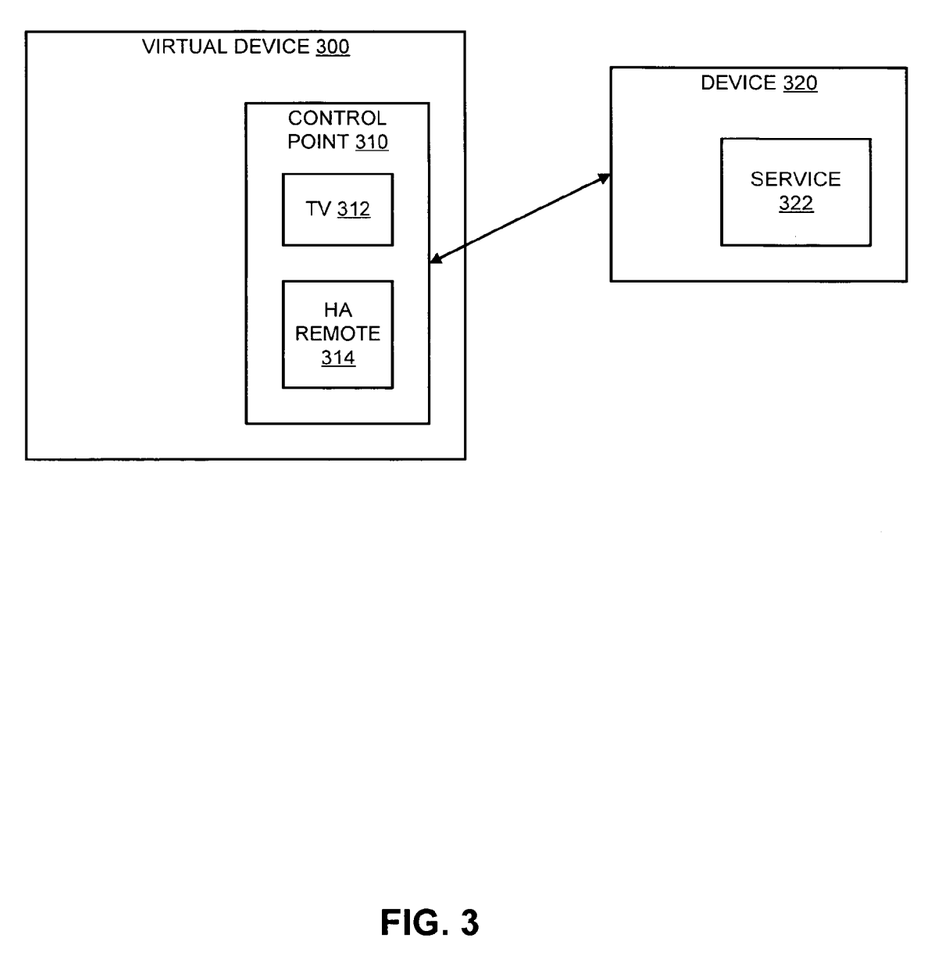
FIG. 3 is a block diagram of an embodiment of a virtual device with a control point coupled to a device having a service.

FIG. 3 is a block diagram of an embodiment of a virtual device with a control point coupled to a device having a service. Virtual device 300 represents a virtual device according to any embodiment described herein. Device 320 represents a networked device that is a node on a distributed network. Device 320 represents a device according to any embodiment described herein. Device 320 includes service 322, which represents one or more services available on device 320. Service 322 may include, for example, a configuration setting, a device state change, a device action or operation, etc.

Control point 310 on virtual device 300 includes one or more controls, or functionality to provide one or more controls. For example, control point 310 may include TV control 312 and/or home automation remote 314. In one embodiment, controls associated with a physical TV controller or a home automation remote can be "learned" or programmed into control point 310 to enable virtual device 300 to interface with services controlled via such controllers.

Figure 4:
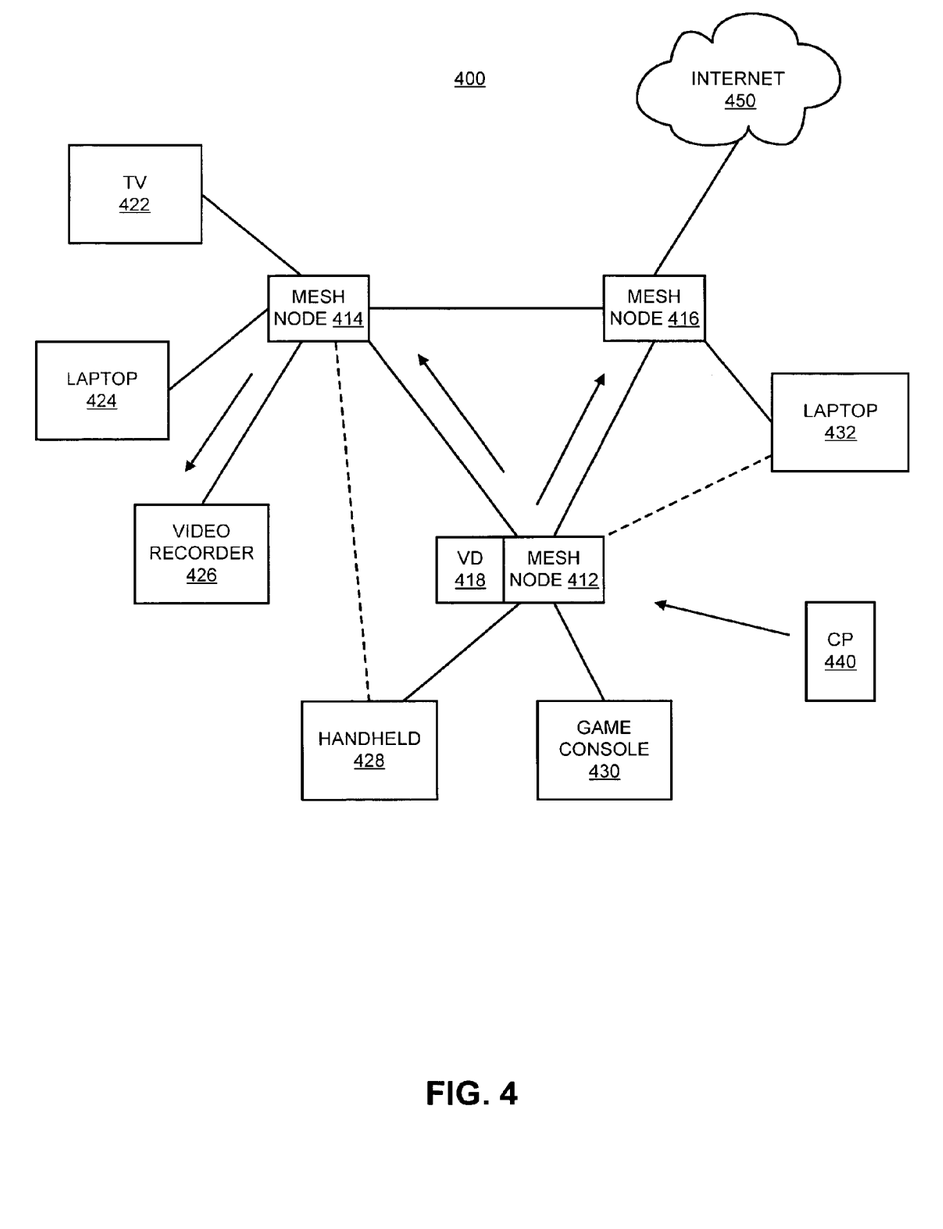
FIG. 4 is a block diagram of an embodiment of a distributed system having multiple different types of devices.

FIG. 4 is a block diagram of an embodiment of a distributed system having multiple different types of devices. Network system 400 is an example of a distributed network. In one embodiment, system 400 is an ESS mesh network. System 400 includes mesh points 412-416. In one embodiment, one or more mesh points 412-416 is a wireless access point (AP).

Mesh point 412 includes virtual device 418, which provides virtualization of services available within system 400. The services are available from the devices on system 400. The devices could be any of a number of types of electronic device. Examples include television 422, laptop 424, video recorder 426, handheld computing device 428, game console 430, laptop 432, etc. The devices access system 400 via a mesh node. Some devices may be within range of multiple mesh nodes, and access through a selected mesh node. Each device includes one or more services, and can be accessed and controlled through a control point configured to the particular service.

Control point (CP) 440 represents a mechanism through which a control message is generated for one or more devices in system 400. In one embodiment, mesh node 412 is elected the leader node from among nodes 412-416, which is why virtual device 418 of system 400 is associated with mesh node 412. Note that any of mesh nodes 412-416 may include the capability to generate virtual device 418. In one embodiment, a single node elected leader generates and executes virtual device 418. Control point 440 can then access the services of the network through the virtualized device. Note the arrows indicate a flow of distribution of a control signal distributed from virtual device 418 to mesh nodes 414-416, and from the mesh nodes on to particular devices.

Figure 5:
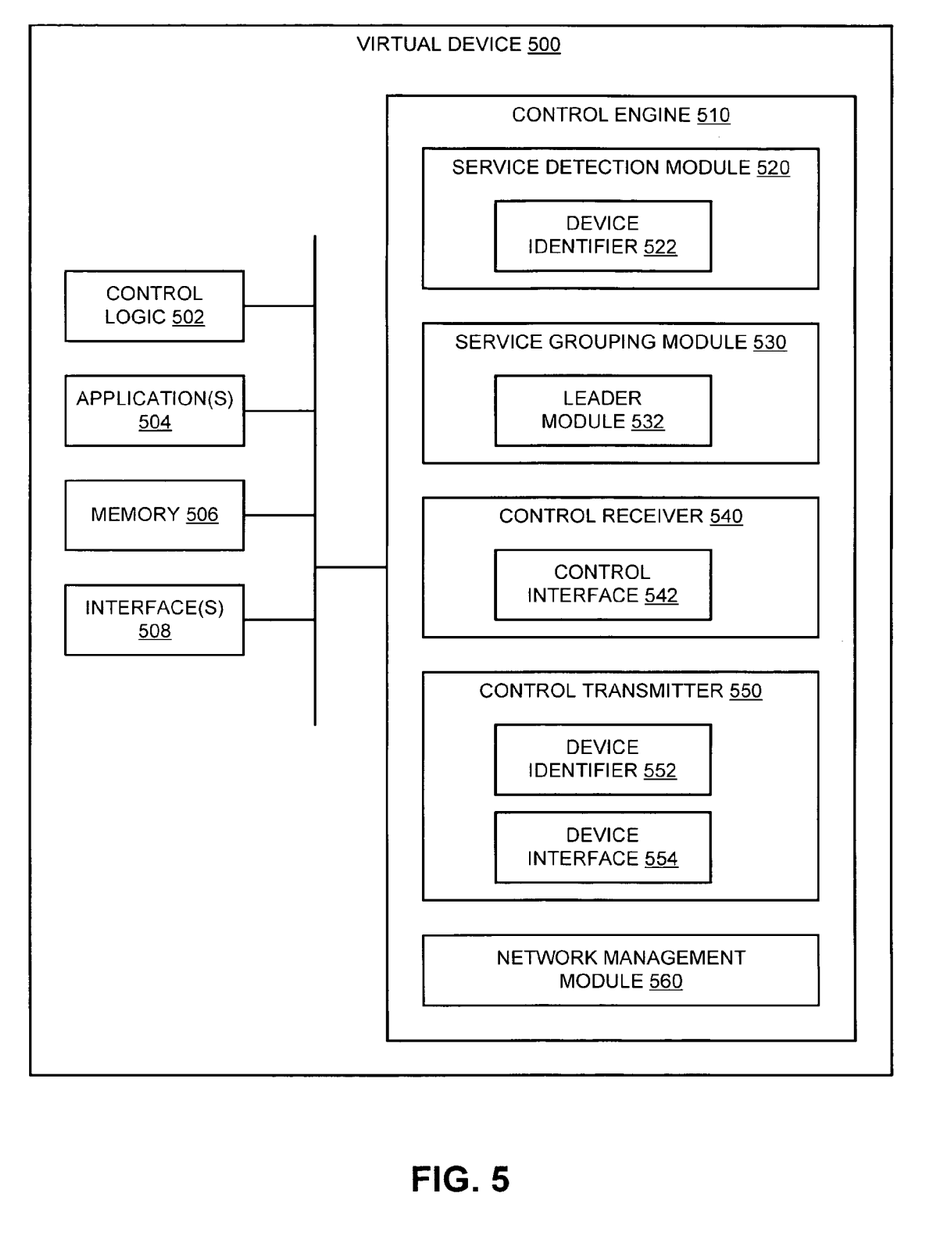
FIG. 5 is a block diagram of an embodiment of a virtual device.

FIG. 5 is a block diagram of an embodiment of a virtual device. Virtual device 500 includes control logic 502, which implements logical functional control to direct operation of virtual device 500, and/or hardware associated with directing operation of virtual device 500. Logic may be hardware logic circuits and/or software routines. In one embodiment, virtual device 500 includes one or more applications 504, which represent code sequence and/or programs that provide instructions to control logic 502. Virtual device 500 includes memory 506 and/or access to memory resource 506 for storing data and/or instructions. Memory 506 may include memory local to virtual device 500, as well as, or alternatively, including memory of the host system on which virtual device 500 resides. Virtual device 500 also includes one or more interfaces 508, which represent access interfaces to/from (an input/output interface) virtual device 500 with regard to entities (electronic or human) external to virtual device 500. Interfaces 508 include mechanisms through which virtual device 500 can be incorporated into a host application, and may further include interfaces from virtual device 500 to other components or applications of a system in which the host application executes.

Virtual device 500 also includes control engine 510, which represents one or more functions that enable virtual device 500 to provide distributed services management in a distributed network. The functions or features include, or are provided by, one or more of service detection module 520, service grouping module 530, control receiver module 540, and control transmitter 550. Each of these modules may further include other modules to provide other functions. As used herein, a module refers to routine, a subsystem, etc., whether implemented in hardware, software, or some combination.

Service detection module 520 enables virtual device 500 to discover services available on a network of which virtual device 500 is a part. Service detection module 520 can discover devices in any known manner, which may include scanning particular ports for services, listening for service advertisements, polling devices, or having preloaded information indicating certain devices and associated services. Service detection module 520 includes device identifier 522, which provides service detection module 520 the ability to determine what services are available with which device. Service detection module 520 can write information related to services and devices to a storage location for subsequent access.

Service grouping module 530 enables virtual device 500 to group or virtualize services. Service grouping module 530 includes leader module 532, which represents one or more functions corresponding to virtual device 500 being on a leader node. Service grouping module 530 determines how to group distributed services under a virtual service. Groupings may be based on an access protocol, a function or action, etc. Thus, there may be a multiple ways various networked services can be grouped. Service grouping module 530 generates a virtual service for one or more groups of services to allow services to be accessed through a single control point. In one embodiment, certain services are determined in a system design to be excluded from control via a virtual service, and are manually controlled. Service grouping module 530 may thus exclude certain virtual services.

Control receiver 540 enables virtual device 500 to receive a control message from a control point. Control receiver 540 includes control interface 542, which may include hardware and/or software to interface with a control point.

Control transmitter 550 enables virtual device 500 to distribute a received control message to other devices in the network. Control transmitter 550 includes device identifier 552 to identify one or more devices that are associated with the control message. Device identifier 552 accesses stored services to determine to which group or groups of services the control message applies, and determine which devices are associated with those services. Control transmitter 550 includes device interface 554, which provides hardware and/or software through which virtual device 500 can distribute control messages over the network to identified devices that include a service affected by the control message. In one embodiment, virtual device 500 maintains one or more tables of services. The table(s) may include rules associated with one or more services. Device interface 554 can look up rules associated with the service prior to distributing the control message, and distribute the control message according to the rules.

In one embodiment, virtual device 500 includes network management module 560, which can include any of a number of modules that allow virtual device 500 to provide network management. Such functionality is mentioned above, and may include functionality related to error detection and recovery, network diagnostics, security, fault management, bandwidth management, etc.

Virtual device 500 may include hardware, software, and/or a combination of these. In a case where virtual device 500 or its constituent components includes software, the software data, instructions, and/or configuration may be provided via an article of manufacture by a machine/electronic device/ hardware. An article of manufacture may include a machine readable medium having content to provide instructions, data, etc. The content may result in an electronic device as described herein, performing various operations described. A machine readable medium includes any mechanism that provides (i.e., stores and/or transmits) information/content in a form accessible by a machine (e.g., computing device, electronic device, electronic system/subsystem, etc.). For example, a machine readable medium includes recordable/ non-ecordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 6:
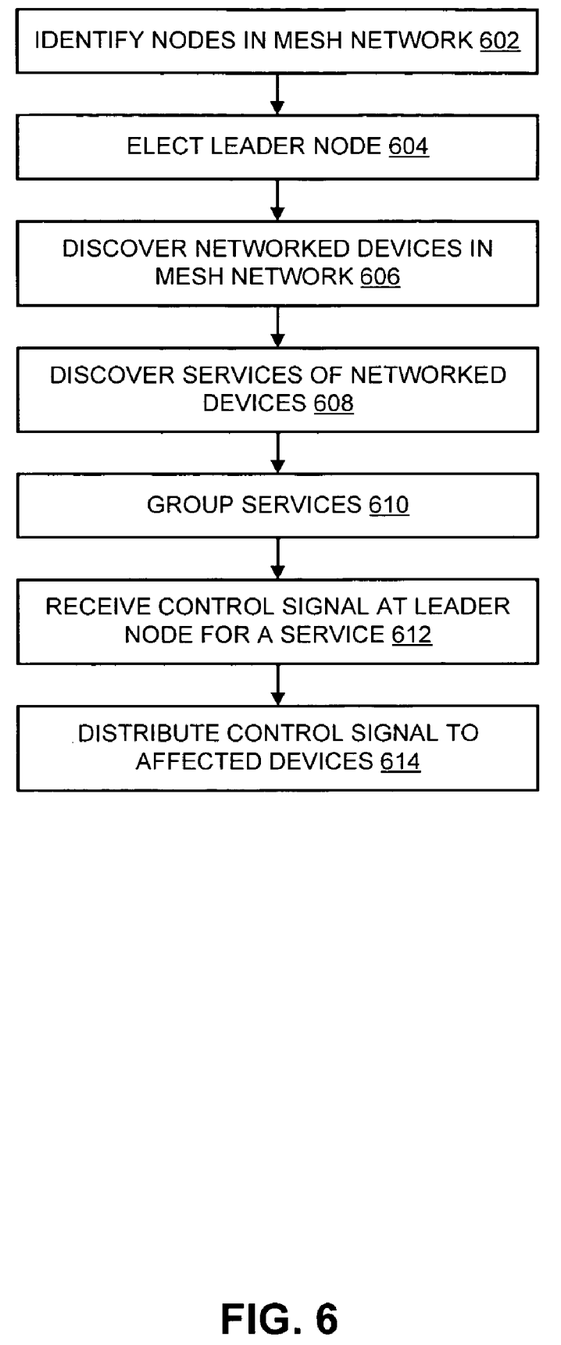
FIG. 6 is a flow diagram of an embodiment of distributing a control signal to devices in a distributed network.

FIG. 6 is a flow diagram of an embodiment of distributing a control signal to devices in a distributed network. Nodes in a distributed or mesh network identify themselves to each other, 602. From the identified nodes, the nodes elect a leader node to act as a control point for distributed services in the network, 604. The elected leader generates a virtual device. The leader discovers the networked devices in the mesh network, 606, and discovers what services are associated with the networked devices, 608. In one embodiment, discovering the services is performed in conjunction with discovering the networked devices.

The virtual device of the leader node determines how to group the discovered services, 610. As discussed above, the grouping may occur in any of a number of ways. The virtual device of the leader node receives a control signal for a service of the network, 612. The service may apply to one or multiple networked devices. The virtual device determines which networked devices have services to which the control signal applies. The virtual device distributes the control signal to the identified affected devices, 614.

A flow diagram as illustrated herein provides an example of a sequence of various operations. Although shown in a particular sequence or order, unless otherwise specified, the order of the operations can be modified. Thus, the illustrated implementations should be understood only as examples, and operations can be performed in a different order, and some operations may be performed in parallel.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method comprising:
   identifying a plurality of networked devices included in an extended service set (ESS) mesh network, the ESS mesh network to further include a mesh node comprising a wireless access point;
   discovering a plurality of distributed services, each of the plurality of distributed services available from one of the plurality of networked devices for use within the ESS mesh network, wherein discovering is based on listening for advertisements for each of the plurality of distributed services discovered, discovering to further include identifying a control rule associated with each respective distributed service, and an identifier of the networked device where the respective distributed service is available;
   associating the plurality of distributed services in a group of distributed services;
   generating a virtual device to include the group of distributed services to provide a single point of control for the group of distributed services, the virtual device included in the mesh node of the ESS mesh network, and the virtual device coupled to a storage device to store the control rules associated with each respective distributed service and the identifier of the networked device where the respective distributed service is available;
   receiving a control for the group of distributed services at the virtual device; and
   distributing the control to each distributed service associated with the group of distributed services, wherein distributing the control to each distributed service is based on the control rule associated with each respective distributed service and the identifier of the networked device where the respective distributed service is available.

2. The method of claim 1, wherein discovering the plurality of distributed services of the ESS mesh network comprises:
   discovering a configuration setting of one of the plurality of networked devices.

3. The method of claim 1, wherein discovering the plurality of distributed services of the ESS mesh network comprises:
   discovering a device state.

4. The method of claim 1, wherein discovering the plurality of distributed services of the ESS mesh network comprises:
   discovering an action available from one of the plurality of networked devices.

5. The method of claim 1, wherein associating the plurality of distributed services in the group of distributed services comprises:
   storing similar services in a table on the storage device.

6. An extended service set (ESS) mesh network, comprising:
   an access point through which a plurality of networked devices, each having a distributed service, are coupled to the distributed network;
   a leader node included in the access point, the leader node including a virtual device having:
   a service detection module to discover the distributed service of at least one of the plurality of networked device based on listening for advertisements for each of the plurality of distributed services discovered, discovering to further include identifying a control rule associated with each respective distributed service and an identifier of the networked device where the respective distributed service is available;

a service grouping module to generate a virtual service to group the distributed service with another distributed service of another networked device;

a storage device to store the control rules associated with each respective distributed service and the identifier of the networked device where the respective distributed service is available;

a control signal receiver to receive a control signal applicable to the distributed services of the virtual service group; and a device interface to distribute the received control signal to the networked devices through the access point, wherein distributing the control to each distributed service is based on the control rule associated with each respective distributed service and the identifier of the networked device where the respective distributed service is available.

7. The ESS mesh network system of claim 6, wherein the virtual device further comprises:

a network management module to provide network management.

8. The ESS mesh network of claim 7, the network management module to further provide network fault tolerance with respect to the access point.

9. The ESS mesh network of claim 6, wherein the device interface includes stored device-specific control codes, and wherein the device interface distributes the device-specific control codes in response to receiving the control signal.

10. An article of manufacture comprising a machine readable storage medium having content stored thereon to provide instructions to cause a processor to perform operations including:

identifying a plurality of networked devices included in an extended service set (ESS) mesh network, the ESS mesh network to further include a mesh node comprising a wireless access point;

discovering a plurality of distributed services, each of the plurality of distributed services available from one of the plurality of networked devices for use within the ESS mesh network, wherein discovering is based on listening for advertisements for each of the plurality of distributed services discovered, discovering to further include identifying a control rule associated with each respective distributed service, and an identifier of the networked device where the respective distributed service is available;

associating the plurality of distributed services in a group of distributed services;

generating a virtual device to include the group of distributed services to provide a single point of control for the group of distributed services, the virtual device included in the mesh node of the ESS mesh network, and the virtual device coupled to a storage device to store the control rules associated with each respective distributed service and the identifier of the networked device where the respective distributed service is available;

receiving a control for the group of distributed services at the virtual device, and distributing the control to each distributed service associated with the group of distributed services, wherein distributing the control to each distributed service is based on the control rule associated with each respective distributed service and the identifier of the networked device where the respective distributed service is available.

11. The article of manufacture of claim 10, wherein discovering the plurality of distributed services of the distributed network comprises:

discovering a configuration setting of one of the plurality of networked devices.

12. The article of manufacture of claim 10, wherein discovering the plurality of distributed services of the distributed network comprises:

discovering a device state.

13. The article of manufacture of claim 10, wherein discovering the plurality of distributed services of the distributed network corn comprises:

discovering an action available from one of the plurality of networked devices.

14. article of manufacture of claim 10, wherein associating the plurality of distributed services in the group of distributed services comprises:

storing similar services in a table on the storage device.

* * * * *

UNITED STATES PATENT AND TRADEMARK OFFICE
CERTIFICATE OF CORRECTION

PATENT NO. : 7,594,007 B2  
APPLICATION NO. : 11/479642  
DATED : September 22, 2009  
INVENTOR(S) : Kushalnagar et al.

Page 1 of 1

It is certified that error appears in the above-identified patent and that said Letters Patent is hereby corrected as shown below:

In column 8, at line 64 delete, "device" and insert -- devices --.

In column 10, at line 41 insert -- The --.

Signed and Sealed this

Twenty-ninth Day of December, 2009

David J. Kappos  
*Director of the United States Patent and Trademark Office*